United States Patent [19]
Kirchberg

[11] Patent Number: 4,937,720
[45] Date of Patent: Jun. 26, 1990

[54] PWM INVERTER CIRCUIT ANALYTICALLY COMPENSATING FOR DC LINK DISTORTION

[75] Inventor: Maurice A. Kirchberg, Freeport, Ill.

[73] Assignee: Sundstrand Corporation, Rockford, Ill.

[21] Appl. No.: 421,221

[22] Filed: Oct. 13, 1989

[51] Int. Cl.$^5$ .............................................. H02M 1/12
[52] U.S. Cl. .................................... 363/41; 363/35; 363/37
[58] Field of Search .................. 363/35, 37, 39, 40, 363/41, 51, 78, 79, 95, 96, 97

[56] References Cited

U.S. PATENT DOCUMENTS

| | | | |
|---|---|---|---|
| 3,648,150 | 3/1972 | Kernick et al. | 321/9 |
| 4,382,275 | 3/1983 | Glennon | 363/41 |
| 4,387,421 | 6/1983 | Zach et al. | 363/41 |
| 4,527,226 | 7/1985 | Glennon | 363/41 |
| 4,562,524 | 12/1985 | Mutoh et al. | 363/41 |
| 4,591,963 | 5/1986 | Retotar | 363/40 |
| 4,626,979 | 12/1986 | JaQuay | 363/41 |
| 4,646,221 | 2/1987 | Sekino et al. | 363/41 |
| 4,757,432 | 7/1988 | Hancock | 363/17 |
| 4,757,434 | 7/1988 | Kawabata | 363/17 |
| 4,800,478 | 1/1989 | Takahashi | 363/41 |

Primary Examiner—Peter S. Wong
Attorney, Agent, or Firm—David H. Hitt

[57] ABSTRACT

This invention relates to a VSCF system for aircraft power generation having a DC source, the DC source producing a DC signal. An inverter is coupled to the DC source and produces a constant frequency AC signal from the DC signal. It is known that, in converting the DC signal to the AC signal, the inverter distorts the DC signal, producing harmonic content therein. Accordingly, an inverter controller is provided which analytically determines distortion of the DC signal due to inverter action and alters PWM patterns fed to the inverter to precompensate for harmonic content in the DC signal.

20 Claims, 5 Drawing Sheets 4,937,720

PWM INVERTER CIRCUIT ANALYTICALLY COMPENSATING FOR DC LINK DISTORTION

Technical Field

This invention relates to a pulse width modulated ("PWM") inverter which is controlled in response to, among other things, DC link distortion. By analytically determining distortion of the DC link due to application of a particular PWM pattern to the link and altering the PWM inverter pattern to precompensate for the anticipated distortion, it is possible to provide an AC inverter output signal having reduced harmonic content.

Background Art

For years, PWM inverters have been employed to convert DC into AC. In many applications, it is important to carefully regulate the quality of the AC emerging from the inverter. Accordingly, it was customary in past control schemes to define a point of regulation ("POR") downstream of the inverter at which the voltage and current of the AC signal emerging from the inverter would be sampled. The sampled voltage and current would be used to aid in the selection of appropriate PWM switching patterns to minimize distortion at the POR.

Representative of such control schemes is U.S. Pat. No. 4,527,226, which issued on July 2, 1985 to Glennon and is commonly assigned with the subject invention, directed to an inverter control system for selecting an angle set defining an inverter output waveform in response to various operating conditions of the inverter. The inverter control system selects an angle set in response to signals representing the power factor of the load and the normalized DC bus voltage to minimize the harmonic content of the inverter output waveform and to compensate for voltage drops occurring between the DC power supply and the load. The inverter control system is also responsive to the inverter filter output current to detect fault conditions and, in response thereto, to select at least one angle set defining a waveform to reduce the voltage at the load to zero while allowing the filter output current to increase to a given percentage of the rated current.

The subject invention, in contrast, introduces a DC to AC voltage inverter circuit having reduced harmonic content AC output accomplished by analytically determining DC link distortion due to application of a PWM pattern. The PWM pattern is then adjusted to compensate for the anticipated DC link harmonic distortion, thereby providing an AC output having reduced harmonic content.

The subject invention is the first to provide a DC to AC voltage inverter circuit having reduced harmonic output accomplished by analytically determining DC link distortion and adjusting a PWM pattern fed to the inverter circuit to precompensate for the analytically determined distortion thereby providing the output signal with a reduced harmonic content. Accordingly, the subject invention represents an evolutionary step over the patent to Glennon in that inverter control in the subject invention comprises an analytical determination of DC voltage rather than a normalization of actual DC bus voltage.

The subject invention is designed to overcome the problem when a DC link, providing direct current to an inverter, has harmonic distortion due to inverter action associated therewith. In other words, prior inventions assumed a "stiff" DC link and thereby failed to control inverter switches in response to variations in DC link voltage to thereby eliminate the effect of DC link voltage variations on inverter output. The subject invention recognizes that a DC inverter source may contain variations in voltage (distortion) and that the distortion may be analytically determined by taking the AC output waveform at the POR applying thereto a mathematical reverse transformation to determine DC link distortion. Accordingly, the subject invention is the first to adjust the PWM pattern in response to this analysis to precompensate for the distortion, thereby allowing the inverter to negate its effect on the AC output waveform.

Disclosure of Invention

It is therefore a primary object of the subject invention to provide an AC power source comprising an inverter circuit for receiving and applying a PWM pattern to a DC signal to produce an AC signal from the DC signal and an inverter controller circuit for analytically determining distortion of the DC signal due to application of the PWM pattern to the DC signal, the inverter control circuit altering the PWM pattern to precompensate for the distortion.

Another object of the invention is to provide an AC power source wherein a DC signal is provided by a DC source comprising a mechanism for producing a wild frequency AC signal and a circuit for rectifying the wild frequency AC signal into the DC signal.

Still another object of the invention is to provide an AC power source wherein an inverter control circuit provides an inverter control output signal to an inverter circuit, the inverter control output signal delivering a PWM pattern to the inverter circuit.

A still further object of the invention is to provide an AC power source wherein an inverter circuit provides an AC signal to a circuit for filtering the AC signal to thereby provide a filtered output signal having reduced harmonic content.

Yet a further object in the invention is to provide an AC power source wherein an inverter circuit is controlled in response to a filtered output signal.

Yet another object of the invention is to provide an AC power source wherein a filtered output signal is provided to electrical loads.

Still another object of the invention is to provide an AC power source wherein a PWM pattern comprises a set of switching times, the PWM pattern controlling switches within an inverter circuit.

A final object of the invention is to provide a method for Providing AC power having reduced harmonic content, comprising the steps of analytically determining distortion of a DC signal due to application of a PWM pattern to the DC signal, altering the PWM pattern to precompensate for the distortion, receiving the DC signal, applying the PWM pattern to the DC signal to produce an AC signal from the DC signal.

In the attainment of the foregoing objects, the apparatus that encompasses the preferred embodiment of the invention is a variable speed constant frequency ("VSCF") system having a DC source, the DC source producing a DC signal and an inverter circuit coupled to the DC source for receiving and applying a PWM pattern to the DC signal to produce an AC signal from the DC signal. The VSCF system further includes an inverter controller which analytically determines distortion of the DC signal due to application of the PWM pattern to the DC signal, the controller altering the PWM pattern to precompensate for the distortion. The DC source comprises a mechanism to produce a wild frequency AC signal and a circuit to rectify the wild frequency AC signal into the DC signal. The inverter controller provides an inverter control output signal to the inverter circuit, the inverter control output signal delivering the PWM pattern to the inverter circuit.

The AC signal is delivered to a filtering circuit, the filtering circuit providing a filtered output signal having reduced harmonic content. The inverter circuit is controlled in response to the filtered output signal. The filtered output signal is provided to electrical loads. The filtered output signal in the preferred embodiment is a three phase, 400 Hz signal.

Other objects and advantages of the subject invention will be apparent upon reference to the accompanying description when taken in conjunction with the following drawings:

Best Mode For Carrying Out Invention

Figure 1:
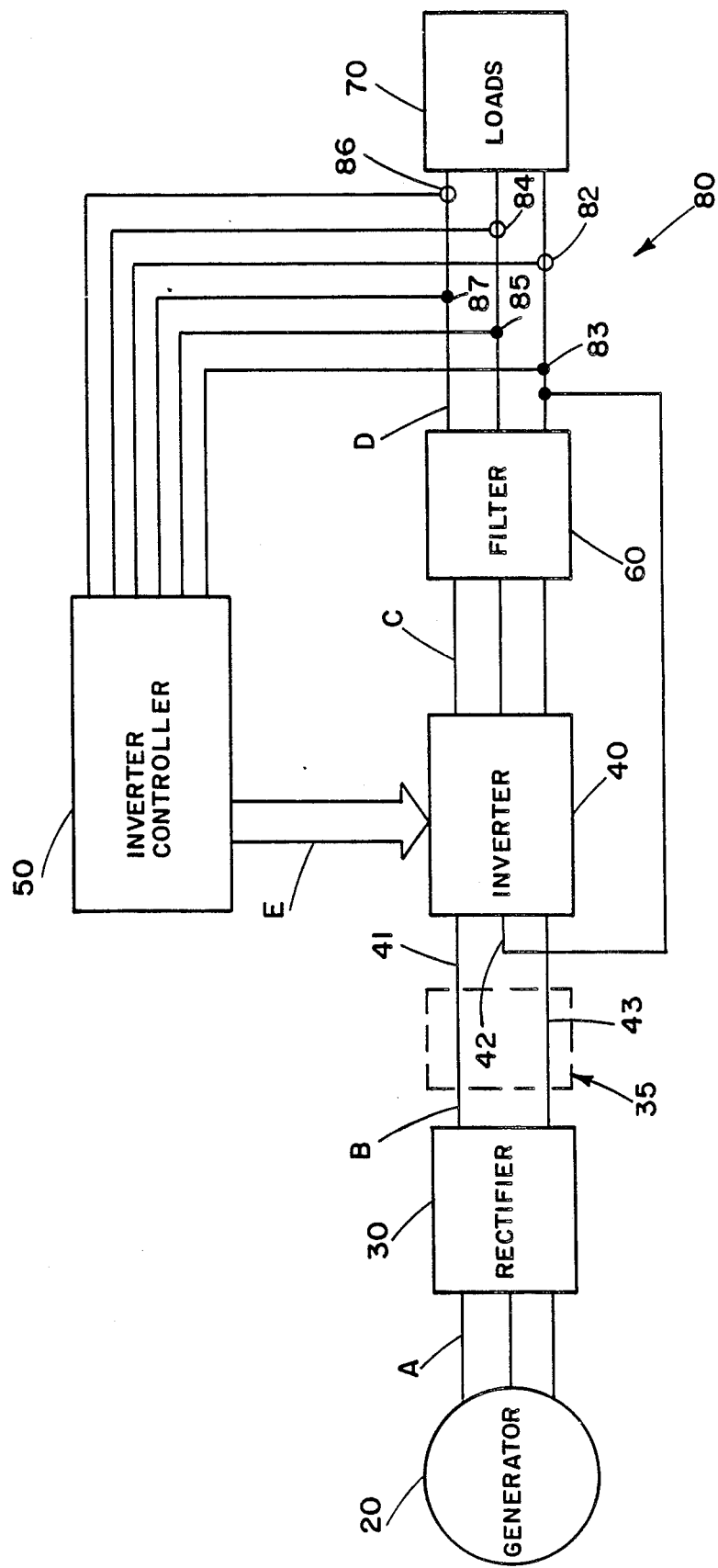
FIG. 1 is a block diagram of the VSCF system embodying the invention.

FIG. 1 is a block diagram of the VSCF system embodying the subject invention. A generator 20 is mechanically coupled to a variable speed prime mover (not shown). Accordingly, the generator 20 produces power of a frequency which varies as a function of the speed of the prime mover (not shown). The resulting AC power is therefor termed "wild frequency" AC Power and is unsuitable for use by aircraft electrical systems or loads, the preferred environment for operation of a VSCF system.

Accordingly, a VSCF system is designed to convert the wild frequency AC power produced by the generator 20 into constant frequency AC power (typically at a frequency of 400 Hz) for use by aircraft electrical systems. Wild frequency AC power produced by the generator 20 is fed to a rectifier 30 which rectifies the power into DC power. The DC power is fed to a DC link 35 having a positive DC rail 41 and a negative DC rail 43. The DC link 35, for the purpose of explaining the subject invention, is shown graphically by a broken line box which overlaps positive and negative rails 41, 43. An inverter 40, under control of an inverter controller 50, produces, by pulse width modulation in the preferred embodiment, a controlled inverter output pattern signal from the DC power which is fed to a filter 60. The filter 60 smoothes the pattern signal produced by the inverter 40 into a sinusoidal constant frequency AC filtered output signal which is fed to aircraft electrical loads 70.

In the preferred embodiment of the invention, the wild frequency AC output by the generator 20 is three phase AC power. The constant frequency AC power output by the inverter 40 and smoothed by the filter 60 is likewise three phase.

In the preferred embodiment of the invention, the inverter 40 is provided a neutral point via lead 42, derived from an output phase of the filter 60.

The inverter controller 50 is controlled in response to signals sensed from a point of regulation ("POR"), indicated generally as 80, which is located downstream of the filter 60. Current is sensed by use of current transformers 82, 84, 86, which sense each of the three phases output by the filter 60, respectively. Likewise, voltage is sensed by taps 83, 85, 87 applied to each of the three phases output by the filter 60. These transformers and taps 82, 83, 84, 85, 86, 87 feed signals to the inverter controller 50 and are used to select or generate an appropriate PWM switching pattern.

A PWM switching pattern is a collection of switching points or times which is used to operate individual switches (not shown) within the inverter 40, which is of conventional design. Accordingly, when one knows the current and voltage at the POR 80, one can determine the nature of the load 70 and can select or generate an appropriate PWM switching pattern.

Selection or generation of PWM waveforms is well known and can be found in, for instance, U.S. Pat. No. 4,527,226, which issued on July 2, 1985 to Glennon (commonly assigned with the subject invention) and is incorporated herein by reference.

The subject invention is an extension of the known technique for inverter control described above. In that control technique, it was implicitly assumed that output from the rectifier 30 would be a pure DC signal, having no harmonic distortion whatsoever. It was also assumed that application of a PWM pattern to a DC signal would not distort the DC signal. However, neither has proven to be the case. Instead, output of the rectifier 30, which is present on the DC link 35, has a component of harmonic distortion which is caused by, among 9 other things, inverter 40 switching. Therefore, the DC link 35 experiences voltage transients during operation which render its DC signal impure. Accordingly, the assumption that the DC signal and the DC link 35 remains a constant appears to be unfounded.

It is, therefore, the primary object of this invention to control the inverter 40 so as to minimize distortion on the DC link 35 by precompensating for the distortion, thereby minimizing its effect on the AC output of the inverter 40. Accordingly, in the subject invention, the inverter controller 50 analyzes voltage and current at the POR 80, determines an appropriate PWM pattern and mathematically determines distortion on the DC link 35 due to application of the PWM pattern to the DC link 35. The inverter controller 50 then modifies the PWM pattern to compensate for distortion on the DC link 35. The particulars of this mathematical analysis and control will be illustrated and more completely described hereinafter.

Figure 2:
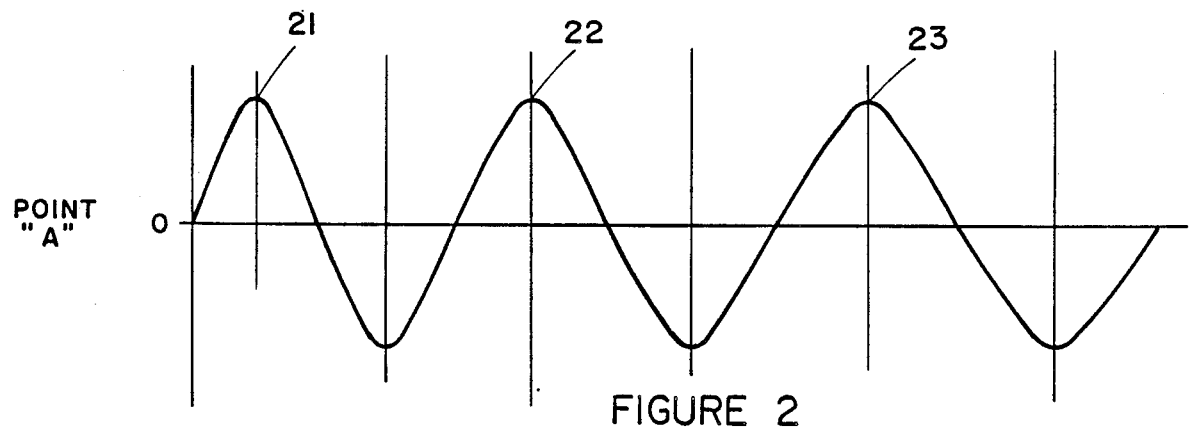
FIG. 2 illustrates a wild frequency AC signal.

FIG. 2 represents a waveform taken at point "A" of FIG. 1. The waveform is a wild frequency AC signal produced by the generator 20 of FIG. 1. Note that the distance from peak 21 to peak 22 is illustrated to show that the distance from peak 21 to peak 22 is less then the distance from peak 22 to peak 23. This is intended to show that the waveform represented in FIG. 2 is of variable frequency. Aircraft electrical loads are sensitive to changes in frequency and therefore are unable to use the wild frequency produced by the generator 20 as shown in FIG. 2. Per FIG. 1, the waveform represented in FIG. 2 is rectified in a rectifier 30, shown in FIG. 1. Output from the rectifier 30, as previously mentioned, is in the form of a "DC link": a positive DC rail 41 and a negative DC rail 43 leading to the inverter 40.

Figure 3:
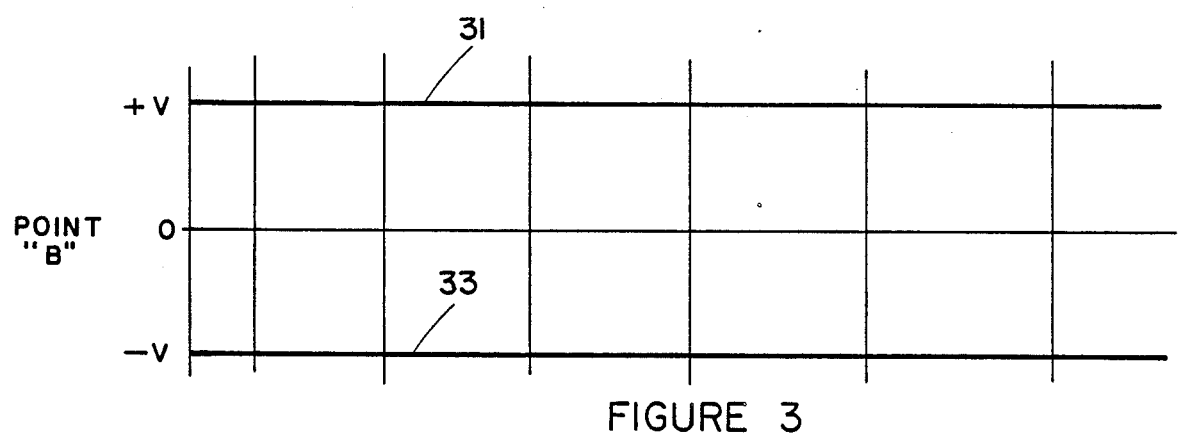
FIG. 3 illustrates a DC signal prior to application of a PWM waveform.

FIG. 3 represents a waveform taken at point "B" of FIG. 1. The waveform is an idealized DC signal, a DC signal produced by the rectifier 30 of FIG. 1 before the inverter 40 applies a PWM pattern thereto. Accordingly, FIG. 3 shows a positive rail voltage 31 and a negative rail voltage 33. For purposes of the subject invention, it is assumed that the DC link voltage is straight and unvarying prior to application of the PWM pattern. Of course, during application of the PWM pattern to the DC link, the positive rail voltage 31 and the negative rail voltage 33 will be distorted; and that distortion will be reflected in the AC waveform output by the inverter 40 of FIG. 1. Again, creation of and compensation for this distortion will be explained more completely hereinafter.

Figure 4:
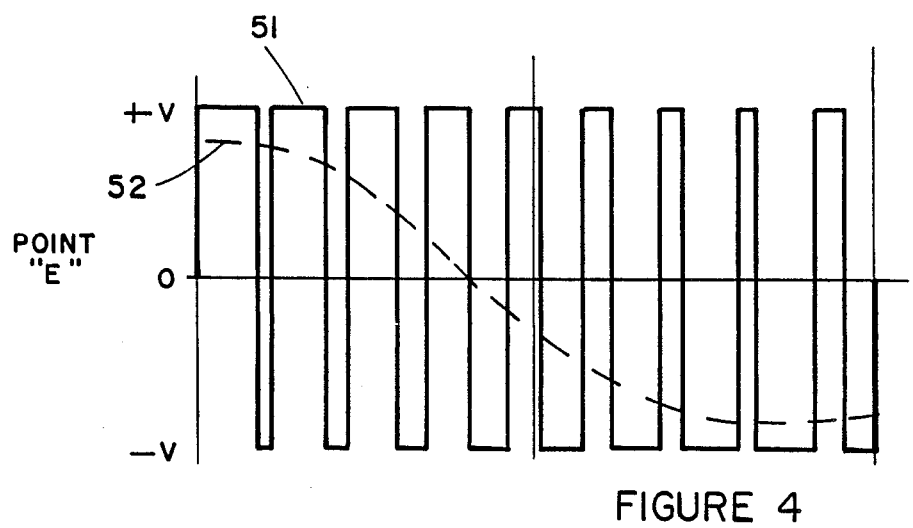
FIG. 4 represents an unadjusted inverter control output signal.

FIG. 4 represents an inverter control output signal indicated generally as 51 and taken at point "E" in FIG. 1. The signal 51 comprises a plurality of switching points which define positive and negative pulses a varying widths. The pulses represent modulations of the DC link which produce an AC waveform when filtered. That waveform is sinusoidal, as represented by a dotted line 52. During operation, the VSCF system must supply power to loads having different real and reactive power requirements. Accordingly, the inverter controller 50 of FIG. 1 must store, or generate in realtime, PWM patterns which are optimized to provide minimum harmonic distortion at the POR 80 for particular operating conditions (i.e. particular real or reactive power load components). The different real and reactive power components of the loads are sensed at the POR 80 as shown in FIG. 1. Accordingly, in response to signals sensed at the POR 80, the inverter controller 50 would produce the inverter control output signal 51 which would be used to control switches (not shown) within the inverter 40 of FIG. 1. Assuming that the DC link is "stiff" prior to application of the inverter control output signal 51, the unmodified signal 51 is applied to the DC link to produce a constant frequency AC waveform 52 which, in the preferred embodiment, is a three phase 400 Hz AC waveform.

Figure 5:
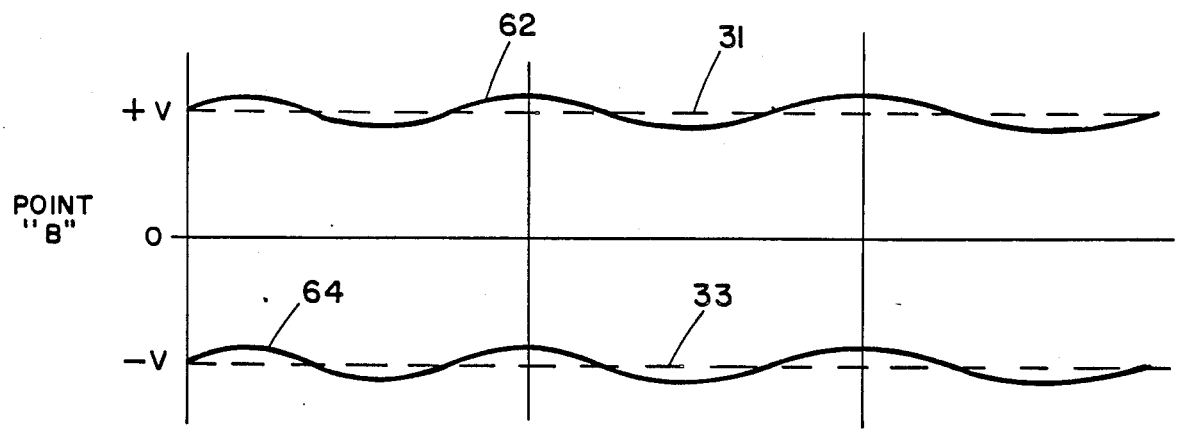
FIG. 5 represents the DC signal of FIG. 3 as distorted by application of the unadjusted inverter control output signal of FIG. 4 thereto.

However, as shown in FIG. 5, when the inverter control output signal 51 of FIG. 4 is applied to the positive rail voltage 31 and the negative rail voltage 33 of FIG. 3, the positive rail voltage 31 and the negative rail voltage 33 distort and bring about harmonic content on the DC link 35 of FIG. 1. This distortion is shown by a distorted positive DC rail 62 and a negative distorted DC rail 64 in FIG. 5. These distorted voltages 62, 64 are distortions in common mode and pass unattenuated and unaltered through the inverter 40, thereby producing distortion at the POR 80 of FIG. 1.

Figure 6:
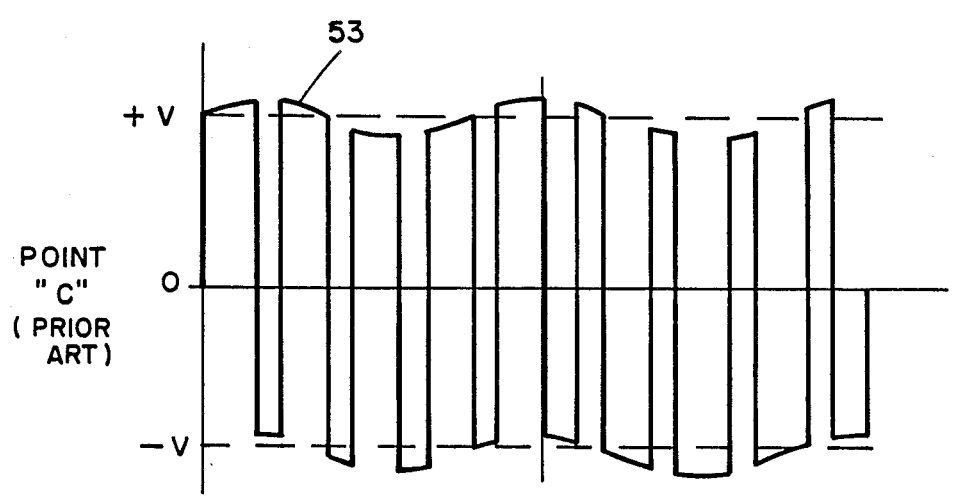
FIG. 6 represents a prior art distorted controlled inverter output pattern signal caused by the DC signal of FIG. 5.

FIG. 6 shows the inverter control output signal of FIG. 4 as applied to the distorted DC link of FIG. 5. Accordingly, FIG. 6 shows a prior art controlled inverter output pattern signal 53 comprising pulses which are distorted in amplitude. The signal 53 represents the output of a prior art inverter because a PWM pattern generated using the subject invention would precompensate for the distorted amplitude.

Figure 7:
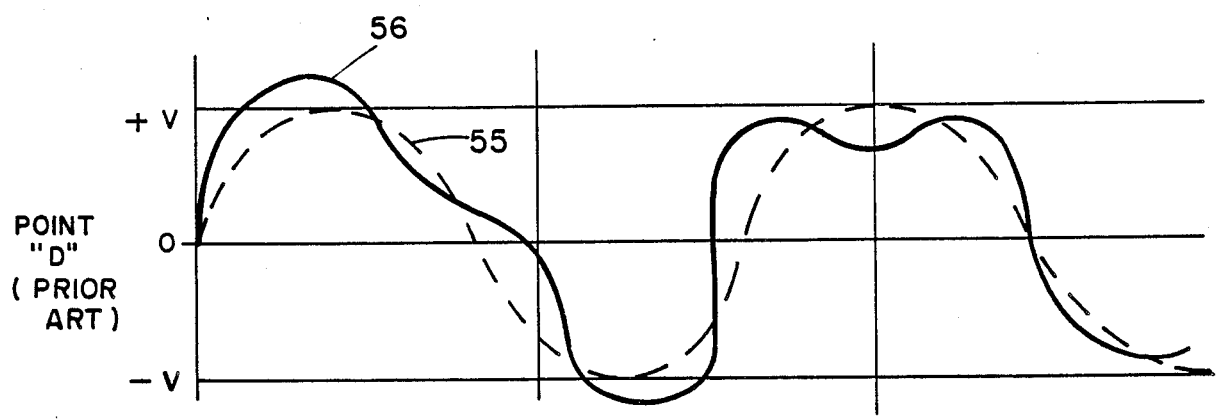
FIG. 7 represents a prior art filtered output signal having reflecting the distortion of FIGS. 5 and 6.

FIG. 7 shows the prior art controlled inverter output pattern signal 53 of FIG. 6 as filtered by the filter 60 of FIG. 1. An idealized AC output waveform 55 is shown to have distortion, designated by line 56. It is the object of the subject invention to minimize the distortion 56.

The inverter controller 50 of the subject invention detects the distortion 56 at the POR 80 of FIG. 1 and recalls or creates in realtime a PWM pattern designed to minimize the distortion 56 at the POR 80. However, since the subject invention assumes that application of the PWM pattern to the DC link 35 will distort the DC link 35 in a known manner, the inverter controller 50 treats the PWM pattern as a mathematical transform, applying it to the distortion 56 to derive therefrom the distortion which would be present on the DC link 35 should the unmodified PWM pattern be applied to the DC link. This reverse transform is performed by fourier analysis in the preferred embodiment. Variable voltage distortion on the DC link can thereby be determined analytically before the distortion is realized. Accordingly, the inverter controller 50 can modify the PWM pattern to precompensate for the distortion the pattern will create when applied to the DC link 35 of FIG. 1.

Again, U.S Pat. No. 4,527,226 to Glennon contains an explanation of selection or generation of PWM patterns in response to a given DC link or load condition.

Figure 8:
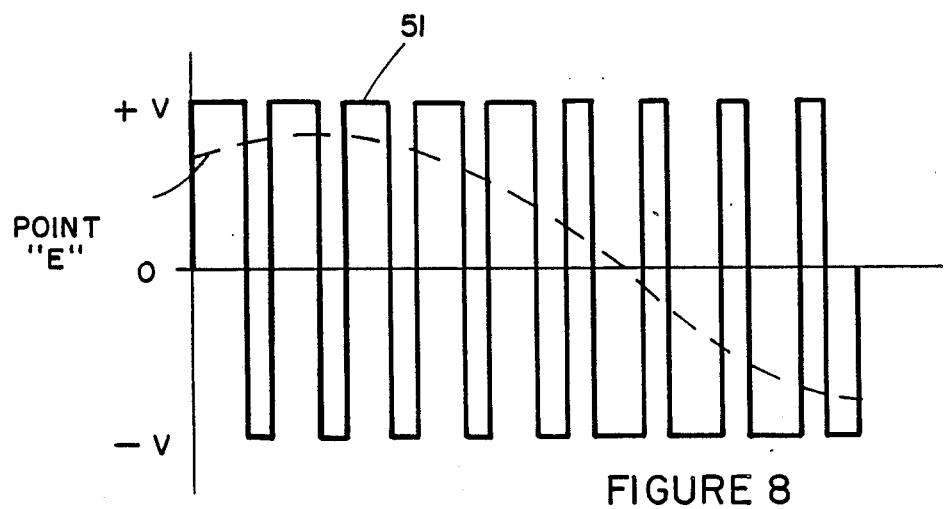
FIG. 8 represents the inverter control output signal of FIG. 4 as analytically adjusted to precompensate for the anticipated DC signal distortion of FIG. 5.

Accordingly, in FIG. 8, the inverter control output signal 51, representing a PWM pattern, is modified by altering its switching points to compensate for the anticipated DC link distortion. As shown, the inverter control output signal 51 has slightly different switching times which manifest themselves in a slightly different filtered AC waveform 52. When this signal 51 is applied to the distorted DC link as shown in FIG. 5, an AC waveform will be Produced which has a lower harmonic content because the DC link distortion will counteract the modified PWM pattern distortion.

The subject invention embodies an iterative process whereby distortion of the controlled inverter output pattern signal produced by the inverter 40 is continually monitored and PWM patterns are modified to varying degrees to account for anticipated DC link distortion caused by application of the PWM patterns to the DC link. Accordingly, harmonic content in the filtered AC output signal waveform will decrease until it reaches a natural point below which is can not be decreased.

Figure 9:
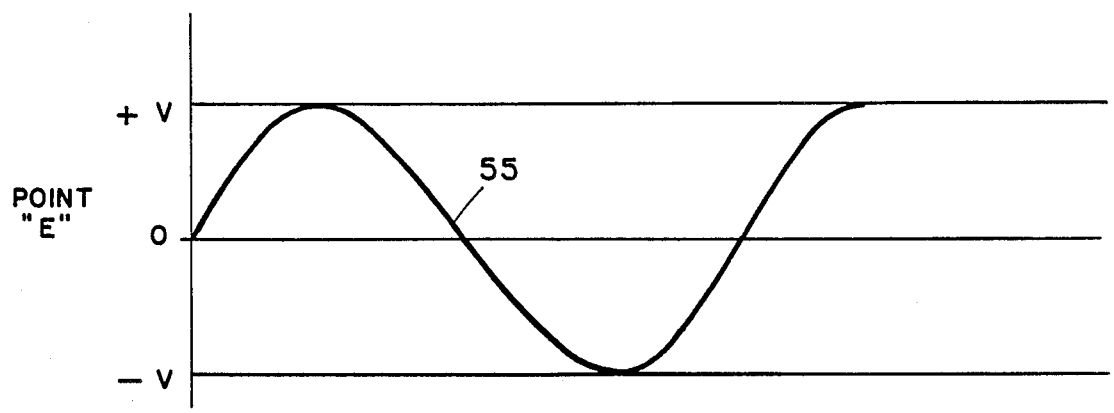
FIG. 9 represents a filtered output signal free of the DC signal distortion of FIG. 5.

FIG. 9 shows an AC output waveform having reduced harmonic content. In the waveform, designated 55, harmonic distortion has been minimized, thereby producing an accurate AC sinusoidal waveform.

Figure 10:
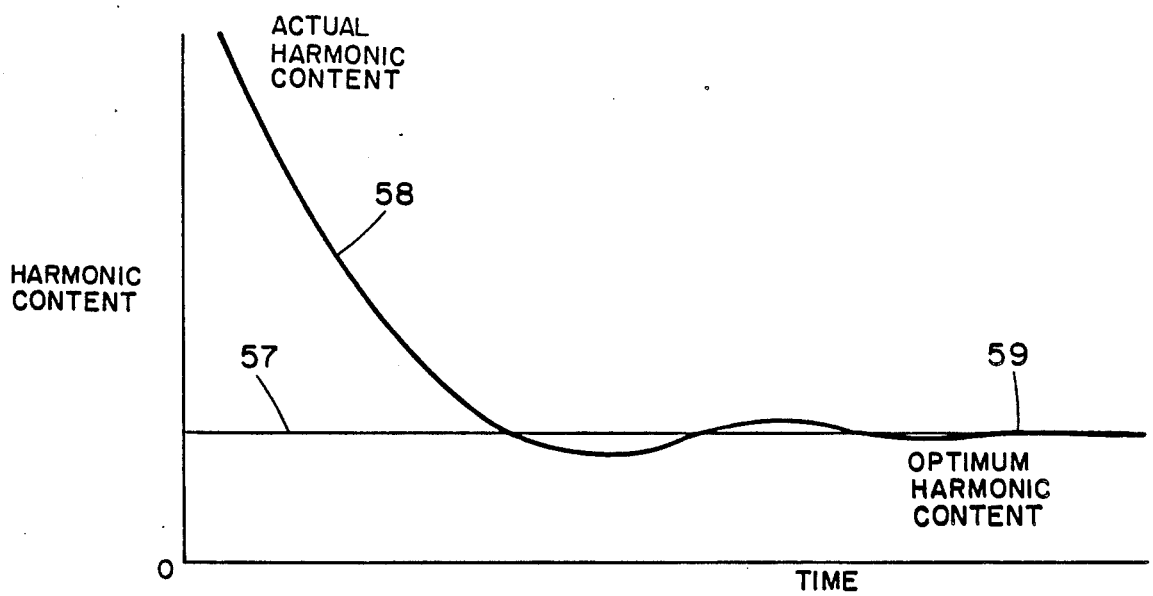
FIG. 10 represents filtered output signal harmonic content as a function of time, representing the iterative nature of the analysis of the subject invention.

FIG. 10 shows actual harmonic content of the filtered AC output signal 55 of FIG. 9 as a function of time. Actual harmonic content, designated 58 begins at a high level, decreases steadily and oscillates about an optimum harmonic content level 57. At a point 59, oscillation of the actual harmonic content level 58 about the optimum harmonic content level 57 will reach near stability. It is at this point that the fourier analysis most accurately predicts and precompensates for DC link distortion.

Referring again to FIG. 1, the subject invention preferably employs a digital computer as the inverter controller 50, although analog control is possible and is within the scope of the subject invention. Accordingly, PWM patterns are selected or created in realtime within the inverter controller 50 in digital form and fed to the inverter 40 to control the same. In the preferred embodiment, PWM patterns are selected or generated depending upon voltages and currents sensed at the POR 80 as previously explained. The inverter control output signal at point "E" is a function of the retrieved or generated PWM pattern and the instantaneous DC link voltage. Prior art inverter controllers assumed this instantaneous voltage to be constant, even in view of application of distortion-causing PWM Patterns thereto, and therefore assumed a constant DC link voltage in fourier analysis routines operating within the inverter controller 50. The subject invention, rather than assuming a constant instantaneous DC link voltage, analytically determines the distortion of the DC link voltage and uses that value in its fourier analysis to produce a stream of switching points representing a PWM pattern which is the inverter control output signal given to the inverter 40.

From the foregoing description it is apparent that the invention described provides a novel AC power source comprising an inverter circuit for receiving and applying a PWM pattern to a DC signal to produce an AC signal from the DC signal and an inverter controller circuit for analytically determining distortion of the DC signal due to application of the PWM pattern to the DC signal, the inverter control circuit altering the PWM pattern to precompensate for the distortion.

Although this invention has been illustrated and described in connection with the particular embodiments illustrated, it will be apparent to those skilled in the art the various changes may be made therein without departing from the spirit of the invention as set forth in the appended claims.

I claim:

1. An AC Power source, comprising:
   inverter means for receiving and applying a PWM pattern to a DC signal to produce an AC signal from said DC signal; and
   inverter controller means for analytically determining distortion of said DC signal due to application of said PWM pattern to said DC signal, said inverter control means altering said PWM pattern to precompensate for said distortion.

2. The AC power source as recited in claim 1 wherein said DC signal is provided by a DC source comprising means for producing a wild frequency AC signal and means for rectifying said wild frequency AC signal into said DC signal.

3. The AC power source as recited in claim 2 wherein said inverter control means provides an inverter control output signal to said inverter means, said inverter control output signal delivering said PWM pattern to said inverter means.

4. The AC power source as recited in claim 3 wherein said inverter means provides said AC signal to a means for filtering said AC signal to thereby provide a filtered output signal having reduced harmonic content.

5. The AC power source as recited in claim 4 wherein said inverter means is controlled in response to said filtered output signal.

6. The AC power source as recited in claim 5 wherein said filtered output signal is provided to electrical loads.

7. The AC power source as recited in claim 6 wherein said PWM pattern comprises a set of switching times, said PWM pattern controlling switches within said inverter means.

8. In a VSCF system having a DC source, said DC source producing a DC signal and inverter means coupled to said DC source for receiving and applying a PWM pattern to said DC signal to produce an AC signal from said DC signal, an inverter controller, comprising:
   means for analytically determining distortion of said DC signal due to application of said PWM pattern to said DC signal, said controller altering said PWM pattern to precompensate for said distortion.

9. The inverter controller as recited in claim 8 wherein said DC source comprises means to produce a wild frequency AC signal and means to rectify said wild frequency AC signal into said DC signal.

10. The inverter controller as recited in claim 9 wherein said inverter controller provides an inverter control output signal to said inverter means, said inverter control output signal delivering said PWM pattern to said inverter means.

11. The inverter controller as recited in claim 10 wherein said AC signal is delivered to filtering means, said filtering means providing a filtered output signal having reduced harmonic content.

12. The inverter controller as recited in claim 11 wherein said inverter means is controlled in response to said filtered output signal.

13. The inverter controller as recited in claim 12 wherein said filtered output signal is provided to electrical loads.

14. A method for Providing AC power having reduced harmonic content, comprising the steps of:
   analytically determining distortion of a DC signal due to application of a PWM pattern to said DC signal;
   altering said PWM pattern to precompensate for said distortion;
   receiving a DC signal; and
   applying a PWM pattern to said DC signal to produce an AC signal from said DC signal.

15. The method as recited in claim 14 wherein providing DC signal comprises the steps of producing a wild frequency AC signal and rectifying said wild frequency AC signal into said DC signal.

16. The method as recited in claim 15 wherein inverter control means provides an inverter control output signal delivering said PWM Pattern to inverter means, said inverter means applying said PWM pattern to said DC signal.

17. The method as recited in claim 16 wherein said method comprises the step of filtering said AC signal to provide a filtered output signal with reduced harmonic content.

18. The method as recited in claim 17 wherein said inverter means is controlled in response to said filtered output signal.

19. The method as recited in claim 18 wherein said filtered output signal is provided to electrical loads.

20. The method as recited in claim 19 wherein said filtered output signal is a three phase, 400 Hz signal.

* * * * *